US012772324B2

(12) United States Patent
Liu et al.

(10) Patent No.: US 12,772,324 B2
(45) Date of Patent: Oct. 20, 2026

(54) METHOD PERFORMED BY USER EQUIPMENT, AND USER EQUIPMENT FOR ENSURING CORRECTNESS OF DATA TRANSMISSION

(71) Applicant: SHARP KABUSHIKI KAISHA, Sakai City (JP)

(72) Inventors: Lei Liu, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 317 days.

(21) Appl. No.: 18/573,934

(22) PCT Filed: Jun. 28, 2022

(86) PCT No.: PCT/CN2022/101862
§ 371 (c)(1),
(2) Date: Dec. 22, 2023

(87) PCT Pub. No.: WO2023/274225
PCT Pub. Date: Jan. 5, 2023

(65) Prior Publication Data

US 2024/0334526 A1 Oct. 3, 2024

(30) Foreign Application Priority Data

Jul. 2, 2021 (CN) ......................... 202110754293.2

(51) Int. Cl.
*H04W 76/19* (2018.01)
*H04W 76/20* (2018.01)
(Continued)

(52) U.S. Cl.
CPC ........... *H04W 76/20* (2018.02); *H04W 76/19* (2018.02); *H04W 76/30* (2018.02); *H04W 92/18* (2013.01)

(58) Field of Classification Search
CPC ..... H04W 76/20; H04W 76/19; H04W 76/30; H04W 92/18; H04W 76/14; H04W 88/04; H04W 40/22; H04W 76/27
See application file for complete search history.

(56) References Cited

U.S. PATENT DOCUMENTS

| | | | | |
|---|---|---|---|---|
| 2021/0051758 | A1 | 2/2021 | Xu et al. | |
| 2021/0352767 | A1* | 11/2021 | Paladugu | H04W 88/04 |
| 2022/0046527 | A1* | 2/2022 | Chang | H04B 7/155 |

FOREIGN PATENT DOCUMENTS

| | | | |
|---|---|---|---|
| CN | 102223658 | A | 10/2011 |
| CN | 112399642 | A | 2/2021 |
| EP | 3471493 | A1 | 4/2019 |

OTHER PUBLICATIONS

Ericsson (Moderator) et al., "New WID on NR Sidelink Relay", RP-210904, 3GPP TSG RAN Meeting #91e, Electronic Meeting, Mar. 16-26, 2021.

(Continued)

*Primary Examiner* — Joseph E Dean, Jr.
(74) *Attorney, Agent, or Firm* — ScienBiziP, P.C.

(57) ABSTRACT

Provided in the present invention is a method performed by user equipment (UE), including: receiving, by the UE acting as remote UE by means of relay UE, a radio resource control (RRC) release message transmitted by a base station; and upon receiving the RRC release message, performing a first action, and transmitting, to the relay UE, a PC5-RRC message including a first indication, the first action including one or a plurality of the following: re-establishing or releasing a PC5 RLC entity, i.e., a PC5 radio link control entity, for bearing a Uu RB, i.e., a Uu radio bearer, between the remote UE and the base station; re-establishing or releasing a PC5 RLC entity for sidelink relay; releasing a logical channel for bearing a Uu RB between the remote UE and the base station; releasing a PC5 RLC entity for sidelink (Continued)

relay; resetting or releasing PC5 MAC, i.e., PC5 Medium Access Control, associated with the relay UE; resetting or releasing PC5 MAC corresponding to a logical channel for sidelink relay; and resetting or releasing PC5 MAC corresponding to a logical channel for bearing a Uu RB between the remote UE and the base station.

6 Claims, 5 Drawing Sheets

(51) Int. Cl.
*H04W 76/30* (2018.01)
*H04W 92/18* (2009.01)

(56) References Cited

OTHER PUBLICATIONS

OPPO, "Revised SID: Study on NR sidelink relay", RP-201474 (revision of RP-193253), 3GPP TSG RAN Meeting #89e, Electronic Meeting, Sep. 14-Sep. 18, 2020.
OPPO, "New SID: Study on NR sidelink relay", RP-193253 (revision of RP-193118), 3GPP TSG RAN Meeting #86, Sitges, Spain, Dec. 9-12, 2019.
Vodafone, "New SID: Study on NR V2X", RP-181429, 3GPP TSG RAN Meeting #80, La Jolla, USA, Jun. 11-14, 2018.
OPPO, "Discussion on service continuity in NR sidelink relay", Tdoc R2-2104894, 3GPP TSG-RAN WG2 #114-e, Electronic Meeting, May 19-27, 2021.
Huawei et al., "Discussion on service continuity and adaptation layer for L2 UE to NW Relay", R2-2105741, 3GPP TSG-RAN WG2 Meeting #114-e, Electronic, May 19-27, 2021.

* cited by examiner

Scenario 1: remote UE is out of coverage

Scenario 2: remote UE is in coverage

Scenario 3: remote UE and relay UE are in different cells

METHOD PERFORMED BY USER EQUIPMENT, AND USER EQUIPMENT FOR ENSURING CORRECTNESS OF DATA TRANSMISSION

TECHNICAL FIELD

The present invention relates to the technical field of wireless communications. More specifically, the present invention relates to a method for RLC and MAC in a sidelink relay architecture performed by user equipment, and corresponding user equipment.

BACKGROUND

At the 3rd Generation Partnership Project (3GPP) RAN #80 plenary meeting in June 2018, the subject of the study on the feasibility of V2X based on 5G NR network technology of Release 16 (see non-patent literature: RP-181480, New SID Proposal: Study on NR V2X) was approved. The primary function included in NR V2X of Release 16 is to support unicast, multicast, and broadcast in out-of-coverage and in-coverage scenarios.

At the RAN #86 plenary meeting in December 2019, a study item on NR sidelink relay (sidelink communication relay) of Release 17 was proposed (see non-patent literature: RP-193253, New Study Item on NR Sidelink Relay), and was approved. Regarding the latest release of the study item, see non-patent literature: RP-201474, Revised SID: NR Sidelink Relay. The study item mainly studies the solution to user equipment (UE)-to-network and UE-to-UE relaying, so as to extend sidelink-based coverage. One of the goals of the study item is to support a sidelink control plane procedure.

At the RAN #91 plenary meeting in March 2020, a work item on NR sidelink relay (sidelink communication relay) of Release 17 was proposed (see non-patent literature: RP-210904, New Study Item on NR Sidelink Relay), and was approved. One of the goals of the work item is to standardize a sidelink control plane procedure, such as management of an RRC connection.

A remote UE, in order to perform sidelink communication with a base station or another remote UE, may need to select a relay UE to provide a relay service for the remote UE. In a UE-to-base station relay architecture, an RRC connection may be established between the remote UE and a base station. In a UE-to-UE relay architecture, an RRC connection may be established between the remote UE and other remote UE.

The present invention discusses processing of the RLC layer and the MAC layer of the remote UE and the relay UE in an RRC connection management procedure.

SUMMARY

In order to address at least part of the aforementioned issues, provided in the present invention are a method performed by user equipment and user equipment, which can ensure the correctness of data transmission and avoid a procedure exception.

According to the present invention, provided is a method performed by user equipment (UE), comprising: receiving, by the UE acting as remote UE by means of relay UE, a radio resource control (RRC) release message transmitted by a base station; and upon receiving the RRC release message, performing a first action, and transmitting, to the relay UE, a PC5-RRC message comprising a first indication, the first action comprising one or a plurality of the following:

re-establishing or releasing a PC5 RLC entity, i.e., a PC5 radio link control entity, for bearing a Uu RB, i.e., a Uu radio bearer, between the remote UE and the base station; re-establishing or releasing a PC5 RLC entity for sidelink relay; releasing a logical channel for bearing a Uu RB between the remote UE and the base station; releasing a PC5 RLC entity for sidelink relay; resetting or releasing PC5 MAC, i.e., PC5 Medium Access Control, associated with the relay UE; resetting or releasing PC5 MAC corresponding to a logical channel for sidelink relay; and resetting or releasing PC5 MAC corresponding to a logical channel for bearing a Uu RB between the remote UE and the base station, and the first indication comprising one or a plurality of the following: a PC5 RLC re-establishment indication; a PC5 RLC release indication; a PC5 MAC reset indication; a PC5 MAC release indication; and an sl-ResetConfig information element.

Preferably, if the remote UE is in one of the following scenarios, the remote UE performs the first action: a timer T300 of the remote UE expires; when an AS layer of the remote UE receives an indication from an upper layer to terminate an RRC connection establishment procedure, and the remote UE has not yet entered an RRC connected state; when the remote UE is in the RRC connected state, a required system message is requested from the base station by means of a Uu interface dedicated message, and after the remote UE transmits a request to the base station, if relay re-selection or cell re-selection occurs before a response from the base station is received; upon the remote UE receiving an RRC reject message transmitted by the base station; and when T304 of the remote UE expires, or a timer similar to T304 and used to control the remote UE to perform path conversion.

In addition, according to the present invention, provided is a method performed by user equipment (UE), comprising: receiving, by the UE acting as relay UE, a PC5-RRC message, i.e., a PC5 radio resource control message, transmitted by remote UE; and if the PC5-RRC message comprises a first indication, performing, by the relay UE, one of the following operations: for cases other than releasing a radio link control (RLC) channel for sidelink relay, releasing a sidelink radio bearer (RB) in the direction, and then performing a second action; when releasing a sidelink RB in the direction, for cases other than releasing an RLC channel for sidelink relay, releasing a packet data convergence protocol (PDCP) and a service data adaptation protocol (SDAP), and then performing a second action; and directly performing a second action, the second action comprising one or a plurality of the following: re-establishing or releasing a PC5 RLC entity for bearing a Uu RB between the remote UE and a base station; re-establishing or releasing a PC5 RLC entity for sidelink relay; releasing a logical channel for bearing a Uu RB between the remote UE and the base station; releasing a PC5 RLC entity for sidelink relay; resetting or releasing PC5 MAC, i.e., PC5 Medium Access Control, associated with the remote UE; resetting or releasing PC5 MAC corresponding to a logical channel for sidelink relay; and resetting or releasing PC5 MAC corresponding to a logical channel for bearing a Uu RB between the remote UE and the base station.

Preferably, the relay UE further performs the following operations: for cases other than releasing a Uu RLC channel for sidelink relay, releasing an RB, and then performing a third action; when releasing an RB, for cases other than releasing a Uu RLC channel for sidelink relay, releasing a Uu PDCP, i.e., a Uu packet data convergence protocol, and a Uu SDAP, i.e., a Uu service data adaptation protocol, and then performing a third action; and directly performing a third action, the third action comprising one or a plurality of the following: re-establishing or releasing a Uu RLC entity for bearing a Uu SRB1, i.e., a Uu signaling radio bearer 1, between the remote UE and the base station; re-establishing or releasing a Uu RLC entity for sidelink relay; releasing a logical channel for bearing a Uu RB between the remote UE and the base station; releasing a Uu RLC entity for sidelink relay; resetting or releasing Uu MAC corresponding to a logical channel for sidelink relay; and resetting or releasing Uu MAC corresponding to a logical channel for bearing a Uu RB between the remote UE and the base station.

Preferably, the method further comprises: before the UE acting as the relay UE receives the PC5-RRC message transmitted by the remote UE, initiating, by the remote UE, a Uu interface RRC connection re-establishment procedure, and transmitting an RRC re-establishment request message to the base station.

In addition, according to the present invention, provided is a method performed by user equipment (UE), comprising: initiating, by the UE acting as remote UE, a Uu interface RRC connection re-establishment procedure; and performing a first action, and transmitting, to relay UE, a PC5-RRC message comprising a first indication, the first action comprising one or a plurality of the following: re-establishing or releasing a PC5 RLC entity, i.e., a PC5 radio link control entity, for bearing a Uu RB, i.e., a Uu radio bearer, between the remote UE and a base station; re-establishing or releasing a PC5 RLC entity for sidelink relay; releasing a logical channel for bearing a Uu RB between the remote UE and the base station; releasing a PC5 RLC entity for sidelink relay; resetting or releasing PC5 MAC, i.e., PC5 Medium Access Control, associated with the relay UE; resetting or releasing PC5 MAC corresponding to a logical channel for sidelink relay; and resetting or releasing PC5 MAC corresponding to a logical channel for bearing a Uu RB between the remote UE and the base station, and the first indication comprising one or a plurality of the following: a PC5 RLC re-establishment indication; a PC5 RLC release indication; a PC5 MAC reset indication; a PC5 MAC release indication; and an sl-ResetConfig information element.

In addition, according to the present invention, provided is a method performed by user equipment (UE), comprising: receiving, by the UE acting as relay UE, a radio resource control (RRC) reconfiguration message transmitted by a base station; and if the RRC reconfiguration message received by the relay UE and transmitted by the base station comprises a second indication, and the second indication is a PC5 RLC re-establishment indication, i.e., a PC5 radio link control re-establishment indication, a PC5 RLC release indication, a PC5 MAC reset indication, i.e., a PC5 Medium Access Control reset indication, or a PC5 MAC release indication, performing, by the relay UE, one of the following operations: for cases other than releasing an RLC channel for sidelink relay, releasing a sidelink radio bearer (RB) in the direction, and then performing a following second action; when releasing a sidelink RB in the direction, for cases other than releasing an RLC channel for sidelink relay, releasing a packet data convergence protocol (PDCP) and a service data adaptation protocol (SDAP), and then performing the second action; and directly performing the second action, the second action comprising one or a plurality of the following: re-establishing or releasing a PC5 RLC entity for bearing a Uu RB between the remote UE and a base station; re-establishing or releasing a PC5 RLC entity for sidelink relay; releasing a logical channel for bearing a Uu RB between the remote UE and the base station; releasing a PC5 RLC entity for sidelink relay; resetting or releasing PC5 MAC associated with the remote UE; resetting or releasing PC5 MAC corresponding to a logical channel for sidelink relay; and resetting or releasing PC5 MAC corresponding to a logical channel for bearing a Uu RB between the remote UE and the base station.

In addition, according to the present invention, provided is a method performed by user equipment (UE), comprising: receiving, by the UE acting as relay UE, a radio resource control (RRC) reconfiguration message transmitted by a base station; and if the RRC reconfiguration message received by the relay UE and transmitted by the base station comprises a second indication, and the second indication is a Uu RLC re-establishment indication, i.e., a Uu radio link control re-establishment indication, a Uu RLC release indication, a Uu MAC reset indication, i.e., a Uu Medium Access Control reset indication, or a Uu MAC release indication, performing, by the relay UE, the following operations: for cases other than releasing a Uu RLC channel for sidelink relay, releasing a radio bearer (RB), and then performing a following third action; when releasing an RB, for cases other than releasing a Uu RLC channel for sidelink relay, releasing a Uu PDCP, i.e., a Uu packet data convergence protocol, and a Uu SDAP, i.e., a Uu service data adaptation protocol, and then performing the third action; and directly performing the third action, the third action comprising one or a plurality of the following: re-establishing or releasing a Uu RLC entity for bearing a Uu SRB1, i.e., a Uu signaling radio bearer 1, between the remote UE and the base station; re-establishing or releasing a Uu RLC entity for sidelink relay; releasing a logical channel for bearing a Uu RB between the remote UE and the base station; releasing a Uu RLC entity for sidelink relay; resetting or releasing Uu MAC corresponding to a logical channel for sidelink relay; and resetting or releasing Uu MAC corresponding to a logical channel for bearing a Uu RB between the remote UE and the base station.

In addition, according to the present invention, provided is a method performed by user equipment (UE), comprising: receiving, by the UE acting as remote UE, a PC5-RRC message, i.e., a PC5 radio resource control message, transmitted by relay UE; and if the message comprises a first indication, performing, by the remote UE, one of the following operations: for cases other than releasing a radio link control (RLC) channel for sidelink relay, releasing a sidelink radio bearer (RB) in the direction, and then performing a following first action; when releasing a sidelink RB in the direction, for cases other than releasing an RLC channel for sidelink relay, releasing a packet data convergence protocol (PDCP) and a service data adaptation protocol (SDAP), and then performing the first action; and directly performing the first action, the first action comprising one or a plurality of the following: re-establishing or releasing a PC5 RLC entity for bearing a Uu RB, i.e., a Uu radio bearer, between the remote UE and a base station; re-establishing or releasing a PC5 RLC entity for sidelink relay; releasing a logical channel for bearing a Uu RB between the remote UE and the base station; releasing a PC5 RLC entity for sidelink relay; resetting or releasing PC5 MAC, i.e., PC5 Medium Access Control, associated with the relay UE; resetting or releasing PC5 MAC corresponding to a logical channel for sidelink relay; and resetting or releasing PC5 MAC corresponding to a logical channel for bearing a Uu RB between the remote UE and the base station.

In addition, according to the present invention, user equipment is provided, comprising: a processor; and a memory, storing instructions, wherein the instructions, when run by the processor, perform the method described above.

According to the present invention, remote UE and relay UE may correctly process PC5 RLC/MAC and Uu RLC/MAC in a procedure related to an air interface RRC connection between the remote UE and a base station, thereby achieving correct setting of variables of RLC and MAC layers in procedures such as air interface RRC connection re-establishment, suspension, and release and prompt cleaning of data that is no longer required to be transmitted, thereby ensuring the correctness of data transmission, and avoiding a procedure exception.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

The following describes some terms involved in the present invention. For the specific meanings of the terms, please see the latest 3GPP standards and specifications.

RedCap: Reduced Capability
UE: User Equipment
NR: New Radio
MAC: Medium Access Control
MAC CE: MAC control element
RLC: Radio Link Control
SDAP: Service Data Adaptation Protocol
PDCP: Packet Data Convergence Protocol
RRC: Radio Resource Control
RRC_CONNECTED: RRC connected state
RRC_INACTIVE: RRC inactive state
RRC_IDLE: RRC idle state
RAN: Radio Access Network
Sidelink: Sidelink communication
SCI: Sidelink Control Information
AS: Access Stratum
IE: Information Element
CE: Control Element
MIB: Master Information Block
NR: New Radio
SIB: System Information Block
NG-RAN: NG Radio Access Network
DCI: Downlink Control Information
ADAPT: adaptation layer
PHY: physical layer
RB: Radio Bearer
DRB: Data Radio Bearer
SRB: Signaling Radio Bearer In the present invention, a network, a base station, and a RAN may be used interchangeably. The network may be a Long Term Evolution (LTE) network, a new RAT (NR) network, an enhanced Long Term Evolution (eLTE) network, or another network defined in a subsequent evolved version of the 3GPP.

In the present invention, user equipment (UE) may refer to an NR device that supports an NR sidelink relay function as described in the background, may also refer to an NR device that supports an NR sidelink relay architecture, and may also refer to an NR device or an LTE device of another type.

In the present invention, sidelink and PC5 may be used interchangeably, and an RLC channel, an RLC entity, and an RLC bearer may be used interchangeably.

Hereinafter, a description will be given of related art of the present invention.

A PC5 interface is an interface for performing control plane and user plane sidelink communication between UE and UE. For sidelink unicast, a PC5-RRC connection is an AS layer logical connection between a pair of a source layer-2 ID and a target layer-2 ID. Setup of one PC5 unicast link corresponds to setup of one PC5-RRC connection.

Figure 7:
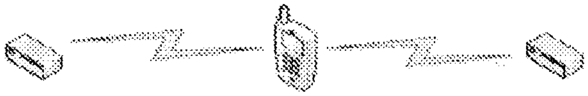
FIG. 7 is a diagram schematically showing UE-to-UE relay.

UE-to-UE relaying is as shown in FIG. 7. The left and the right are remote UEs, and the middle is relay UE. The remote UEs are respectively connected to the relay UE by means of PC5 interfaces. Because the two pieces of remote UE are far from each other or because a communication environment is poor, the relay UE is needed to relay and forward signaling and data therebetween.

UE-to-UE relay scenarios include:

1) in coverage: the two pieces of remote UE (i.e., the source-side UE and the target-side UE) and the relay UE are all in coverage;
2) out of coverage: the two pieces of remote UE (i.e., the source-side UE and the target-side UE) and the relay UE are all out of coverage; and
3) partial coverage: among the two pieces of remote UE and the relay UE, at least one piece of UE is in coverage, and at least one piece of UE is out of coverage.

Figure 8:
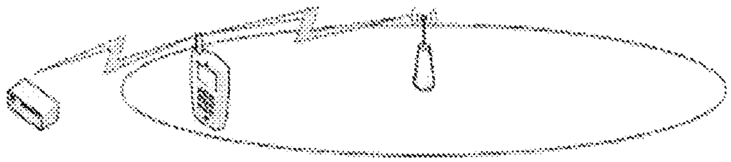
FIG. 8 is a diagram schematically showing scenarios of UE-to-network relay.
Figure 8:
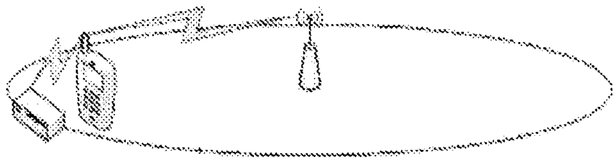
Figure 8:
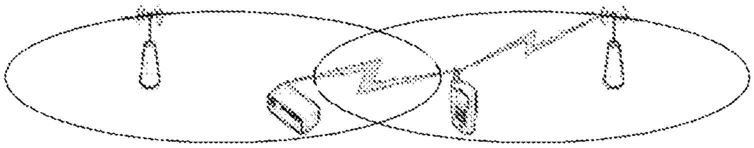

UE-to-network relaying is as shown in FIG. 8. In scenario 1 and scenario 2, the left side is remote UE, the middle is relay UE, and the right side is a network. In scenario 3, both sides are networks, and the middle, from left to right, is remote UE and relay UE, respectively. The remote UE and the relay UE are connected to each other by means of a PC5 interface, and the relay UE is connected to the network by means of a Uu interface. Because the remote UE is far from the network or because the communication environment is poor, the relay UE is needed to relay and forward signaling and data between the remote UE and the network.

UE-to-network relay scenarios include:

1) the remote UE is out of coverage, and the relay UE is in coverage;
2) the remote UE and the relay UE are both in coverage, and are in the same cell; and
3) the remote UE and the relay UE are both in coverage, but are in different cells.

Figure 9:
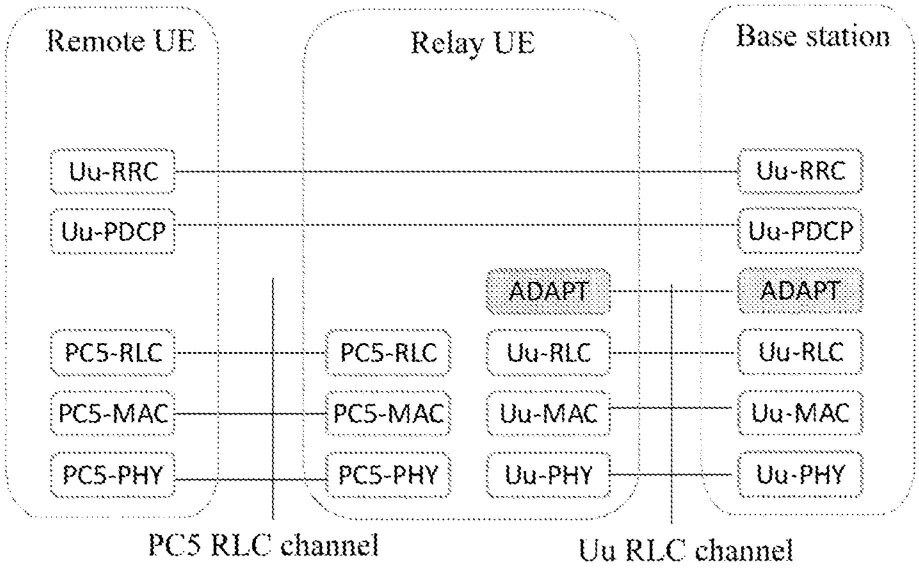
FIG. 9 is a diagram schematically showing control plane protocol stacks of a UE-to-network L2 architecture.

For a sidelink layer-2 (L2) relay architecture, control plane protocol stacks of remote UE, relay UE, and a base station are as shown in FIG. 9.

After the remote UE selects a relay UE to provide a relay service for the remote UE, the remote UE will establish a PC5-RRC connection to the relay UE, so as to communicate with the network by means of the relay UE. The remote UE may establish an air interface RRC connection to the network by means of the relay UE for data transmission between the remote UE and the network. The remote UE encapsulates, in PC5 messages/data, messages to the network such as air interface RRC connection establishment, re-establishment, and resume, and transmits same to the relay UE. The PC5 message is borne on a PC5 RLC channel, and is submitted downwards layer by layer by means of PC5-MAC and PC5-PHY. Upon receiving the message, the relay UE submits same upwards layer by layer by means of PC5-PHY and PC5-MAC. The relay UE finds, by means of a mapping relationship between a PC5 RLC channel and a Uu RLC channel, the Uu RLC channel bearing the message, encapsulates the message in a Uu message/data, and transmits same to the network. In turn, an RRC message returned by the network is encapsulated by the base station in a Uu message/data so as to be transmitted to the relay UE. The relay UE finds, by means of a mapping relationship between a PC5 RLC channel and a Uu RLC channel, the PC5 RLC channel bearing the message, encapsulates the message in a PC5 message/data, and transmits same to the remote UE. When the remote UE initiates procedures such as RRC connection establishment, re-establishment, and resume to the network, in order to be capable of correctly transmitting data when needed and promptly stopping data transmission when not needed, Uu RLC/MAC and PC5 RLC/MAC also need to be subjected to corresponding processing. In turn, the network may also release and suspend, to the remote UE, an air interface RRC connection by means of the relay UE, and in the foregoing procedures, Uu RLC/MAC and PC5 RLC/MAC also need to be subjected to corresponding processing.

By means of the present invention, remote UE and relay UE may correctly process PC5 RLC/MAC and Uu RLC/MAC in a procedure related to an air interface RRC connection between the remote UE and a base station, thereby achieving correct setting of variables of RLC and MAC layers in procedures such as air interface RRC connection re-establishment, suspension, and release and prompt cleaning of data that is no longer required to be transmitted, thereby ensuring the correctness of data transmission, and avoiding a procedure exception.

Hereinafter, several embodiments of the present invention for addressing the above problems are described in detail.

Embodiment 1

Figure 1:
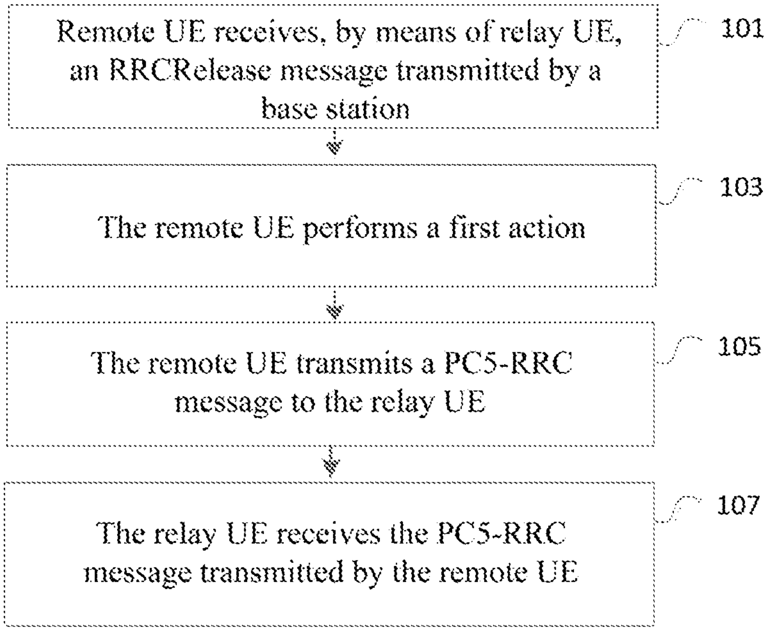
FIG. 1 is a flowchart showing a method performed by user equipment according to Embodiment 1 of the present invention.

As shown in FIG. 1, the present embodiment includes steps 101, 103, 105, and 107.

Optionally, in step 101, remote UE receives, by means of relay UE, an RRCRelease message transmitted by a base station. The message carries a suspendConfig information element.

Optionally, in step 103, the remote UE performs a first action, the first action including one or a plurality of the following:

1) re-establishing or releasing a PC5 RLC entity for bearing a Uu RB (e.g., SRB1, a DRB, or all RBs) between the remote UE and the base station;
2) re-establishing or releasing a PC5 RLC entity for sidelink relay;
3) releasing a logical channel for bearing a Uu RB (e.g., SRB1, a DRB, or all RBs) between the remote UE and the base station;
4) releasing a PC5 RLC entity for sidelink relay;
5) resetting or releasing PC5 MAC (or a corresponding portion in a MAC entity) associated with the relay UE;
6) resetting or releasing PC5 MAC (or a corresponding portion in a MAC entity) corresponding to a logical channel for sidelink relay; and
7) resetting or releasing PC5 MAC (or a corresponding portion in a MAC entity) corresponding to a logical channel for bearing a Uu RB (e.g., SRB1, a DRB, or all RBs) between the remote UE and the base station.

Optionally, in step 105, the remote UE transmits a PC5-RRC message to the relay UE. The PC5-RRC message may be RRCReconfigurationSidelink, or a PC5-RRC message (e.g., RRCReestablishmentSidelink, and the like) is newly added. Optionally, the message may include a first indication, and the first indication is one or a plurality of the following:

a PC5 RLC re-establishment indication;
a PC5 RLC release indication;
a PC5 MAC reset indication;
a PC5 MAC release indication; and
an s1-ResetConfig information element.

Optionally, in step 107, the relay UE receives the PC5-RRC message transmitted by the remote UE.

If the message includes the first indication, the relay UE performs one of the following operations:

1) for cases other than releasing an RLC channel for sidelink relay, releasing a sidelink RB (an SL-DRB and/or an SL-SRB) in the direction, and then performing a second action;
2) when releasing a sidelink RB (an SL-DRB and/or an SL-SRB) in the direction, for cases other than releasing an RLC channel for sidelink relay, releasing a PDCP and an SDAP, and then performing a second action; and
3) directly performing a second action.

The second action includes one or a plurality of the following:

1) re-establishing or releasing a PC5 RLC entity for bearing a Uu RB (e.g., SRB1, a DRB, or all RBs) between the remote UE and the base station;
2) re-establishing or releasing a PC5 RLC entity for sidelink relay;
3) releasing a logical channel for bearing a Uu RB (e.g., SRB1, a DRB, or all RBs) between the remote UE and the base station;
4) releasing a PC5 RLC entity for sidelink relay;
5) resetting or releasing PC5 MAC (or a corresponding portion in a MAC entity) associated with the remote UE;
6) resetting or releasing PC5 MAC (or a corresponding portion in a MAC entity) corresponding to a logical channel for sidelink relay; and 7) resetting or releasing PC5 MAC (or a corresponding portion in a MAC entity) corresponding to a logical channel for bearing a Uu RB (e.g., SRB1, a DRB, or all RBs) between the remote UE and the base station.

Optionally, the relay UE may also perform the following operations according to a PC5 RLC channel, and/or a Uu RLC channel, and/or an ID of a Uu RB between the remote UE and the base station, and/or a mapping relationship of a remote UE ID:

1) for cases other than releasing a Uu RLC channel for sidelink relay, releasing an RB (a DRB and/or an SRB), and then performing a third action;
2) when releasing an RB (a DRB and/or an SRB), for cases other than releasing a Uu RLC channel for sidelink relay, releasing a Uu PDCP and a Uu SDAP, and then performing a third action; and
3) directly performing a third action.

The third action includes one or a plurality of the following:

1) re-establishing or releasing a Uu RLC entity for bearing a Uu SRB1 between the remote UE and the base station;
2) re-establishing or releasing a Uu RLC entity for sidelink relay;
3) releasing a logical channel for bearing a Uu RB (e.g., SRB1, a DRB, or all RBs) between the remote UE and the base station;
4) releasing a Uu RLC entity for sidelink relay;
5) resetting or releasing Uu MAC (or a corresponding portion in a MAC entity) corresponding to a logical channel for sidelink relay; and
6) resetting or releasing Uu MAC (or a corresponding portion in a MAC entity) corresponding to a logical channel for bearing a Uu RB (e.g., SRB1, a DRB, or all RBs) between the remote UE and the base station.

Optionally, in step 101, the remote UE receives, by means of the relay UE, the RRCRelease message transmitted by the base station. If the message does not carry the suspendConfig information element, the remote UE and the relay UE may also perform execution according to the present embodiment.

Embodiment 2

Figure 2:
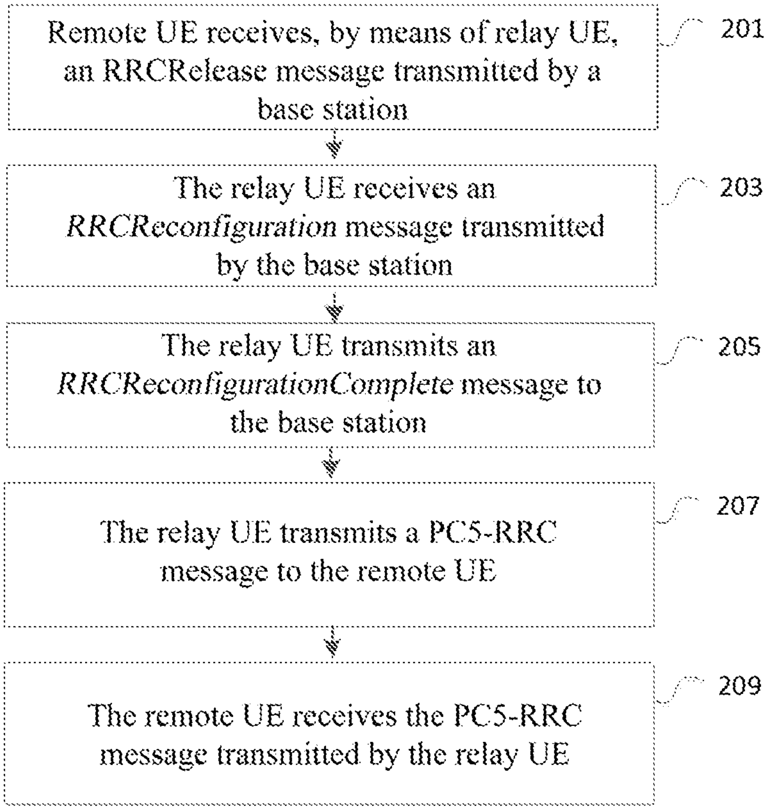
FIG. 2 is a flowchart showing a method performed by user equipment according to Embodiment 2 of the present invention.

As shown in FIG. 2, the present embodiment includes steps 201, 203, 205, 207, and 209.

Optionally, in step 201, remote UE receives, by means of relay UE, an RRCRelease message transmitted by a base station. The message carries a suspendConfig information element.

Optionally, in step 203, the relay UE receives an RRCReconfiguration message transmitted by the base station, wherein the message may include a second indication, and the second indication is one or a plurality of the following:

a Uu RLC re-establishment indication;
a Uu RLC release indication;
a Uu MAC reset indication;
a Uu MAC release indication;
a PC5 RLC re-establishment indication;
a PC5 RLC release indication;
a PC5 MAC reset indication;
a PC5 MAC release indication;
a remote UE PC5 RLC re-establishment indication;
a remote UE PC5 RLC release indication;
a remote UE PC5 MAC reset indication; and
a remote UE PC5 MAC release indication;

If the RRCReconfiguration message received by the relay UE and transmitted by the base station includes a second indication, and the second indication is an indication of PC5 RLC re-establishment, or a PC5 RLC release indication, or a PC5 MAC reset indication, or a PC5 MAC release indication, the relay UE performs one of the following operations:

1) for cases other than releasing an RLC channel for sidelink relay, releasing a sidelink RB (an SL-DRB and/or an SL-SRB) in the direction, and then performing a second action as in step 107;
2) when releasing a sidelink RB (an SL-DRB and/or an SL-SRB) in the direction, for cases other than releasing an RLC channel for sidelink relay, releasing a PDCP and an SDAP, and then performing a second action as in step 107; and
3) directly performing a second action as in step 107.

If the RRCReconfiguration message received by the relay UE and transmitted by the base station includes a second indication, and the second indication is Uu RLC re-establishment, or a Uu RLC release indication, or a Uu MAC reset indication, or a Uu MAC release indication, the relay UE performs the following operations:

1) for cases other than releasing a Uu RLC channel for sidelink relay, releasing an RB (a DRB and/or an SRB), and then performing a third action as in step 107;
2) when releasing an RB (a DRB and/or an SRB), for cases other than releasing a Uu RLC channel for sidelink relay, releasing a Uu PDCP and a Uu SDAP, and then performing a third action as in step 107; and
3) directly performing a third action as in step 107.

Optionally, in step 205, the relay UE transmits an RRCReconfigurationComplete message to the base station.

Optionally, in step 207, the relay UE transmits a PC5-RRC message to the remote UE.

The PC5-RRC message may be RRCReconfigurationSidelink, or a PC5-RRC message (e.g., RRCReestablishmentSidelink, and the like) is newly added. Optionally, the message may include a first indication.

Optionally, based on the second indication included in the RRCReconfiguration message received in step 203 and transmitted by the base station, if the second indication is remote UE PC5 RLC re-establishment, or a remote UE PC5 RLC release indication, or a remote UE PC5 MAC reset indication, or a remote UE PC5 MAC release indication, the relay UE may determine how the first indication is carried in the PC5-RRC message. For example, if the second indication is remote UE PC5 RLC re-establishment, the relay UE sets the first indication to PC5 RLC re-establishment. Others that are similar will not be described again.

Step 205 may also be performed after step 207.

Optionally, in step 209, the remote UE receives the PC5-RRC message transmitted by the relay UE. If the message includes the first indication, the remote UE performs one of the following operations:

1) for cases other than releasing an RLC channel for sidelink relay, releasing a sidelink RB (an SL-DRB and/or an SL-SRB) in the direction, and then performing a first action as in step 103;
2) when releasing a sidelink RB (an SL-DRB and/or an SL-SRB) in the direction, for cases other than releasing an RLC channel for sidelink relay, releasing a PDCP and an SDAP, and then performing a first action as in step 103; and
3) directly performing a first action as in step 103.

Optionally, in step 201, the remote UE receives, by means of the relay UE, the RRCRelease message transmitted by the base station. If the message does not carry the suspendConfig information element, the remote UE and the relay UE may also perform execution according to the present embodiment.

Embodiment 3

Figure 3:
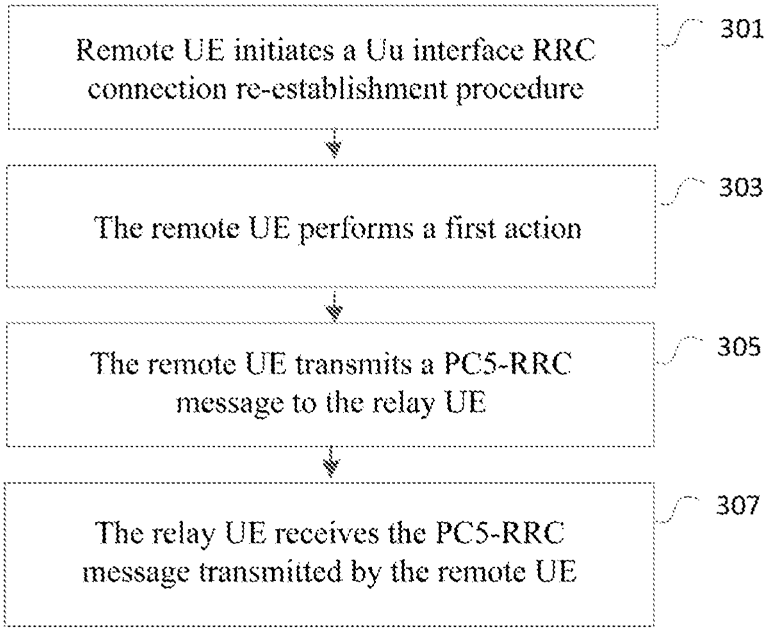
FIG. 3 is a flowchart showing a method performed by user equipment according to Embodiment 3 of the present invention.

As shown in FIG. 3, the present embodiment includes steps 301, 303, 305, and 307.

Optionally, in step 301, remote UE initiates a Uu interface RRC connection re-establishment procedure. Causes of initiation of the procedure may be the following possibilities:

1) the remote UE detects a PC5 link failure;
2) the remote UE receives a Uu interface link failure indication transmitted by relay UE;
3) the remote UE cannot understand, or cannot comply with, or cannot apply configurations (all configurations or some configuration) in an RRC reconfiguration message transmitted by a base station; and
4) a handover failure.

Optionally, the remote UE performs the first action in step 103.

Optionally, the remote UE transmits an RRCReestablishmentRequest message to the base station.

Optionally, step 305 is the same as step 105, and step 307 is the same as step 107.

Embodiment 4

Figure 4:
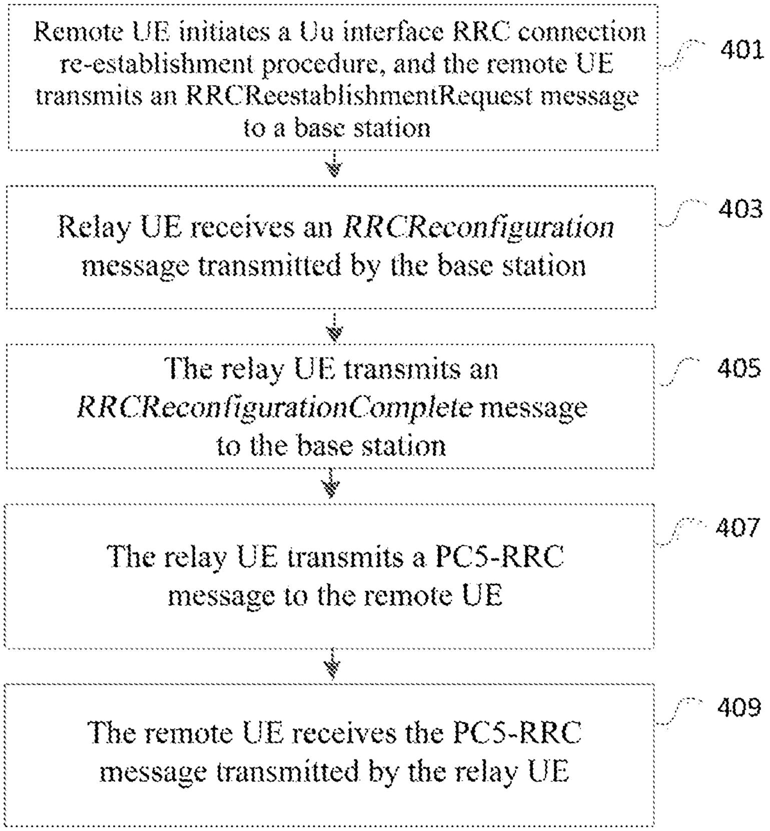
FIG. 4 is a flowchart showing a method performed by user equipment according to Embodiment 4 of the present invention.

As shown in FIG. 4, the present embodiment includes steps 401, 403, 405, 407, and 409.

Optionally, in step 401, remote UE initiates a Uu interface RRC connection re-establishment procedure, and the remote UE transmits an RRCReestablishmentRequest message to a base station.

Optionally, step 403 is the same as step 203.

Optionally, step 405 is the same as step 205.

Optionally, step 407 is the same as step 207.

Optionally, step 409 is the same as step 209.

Embodiment 5

Figure 5:
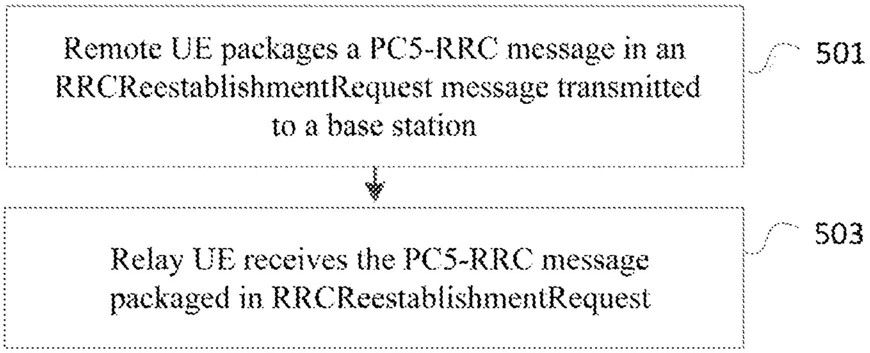
FIG. 5 is a flowchart showing a method performed by user equipment according to Embodiment 5 of the present invention.

As shown in FIG. 5, the present embodiment includes steps 501 and 503.

Optionally, step 501 is the same as step 301, except for the following: the remote UE may package a PC5-RRC message in an RRCReestablishmentRequest message transmitted to a base station. The PC5-RRC message may be RRCReconfigurationSidelink, or a PC5-RRC message (e.g., RRCReestablishmentSidelink, and the like) is newly added. The message may include a first indication.

Optionally, in step 503, relay UE receives the PC5-RRC message packaged in RRCReestablishmentRequest. Other specific processing is as described in step 107.

Embodiment 6

Figure 6:
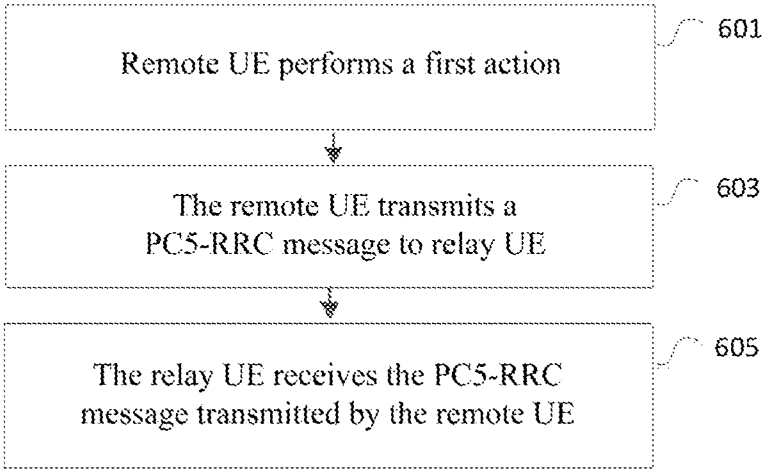
FIG. 6 is a flowchart showing a method performed by user equipment according to Embodiment 6 of the present invention.

As shown in FIG. 6, the present embodiment includes steps 601, 603, and 605.

In step 601, if remote UE is in one of the following scenarios, the remote UE performs the first action in step 103:

1) T300 of the remote UE expires;
2) when an AS layer of the remote UE receives an indication from an upper layer (e.g., a NAS layer) to terminate an RRC connection establishment procedure, and the remote UE has not yet entered a (Uu) RRC connected state;
3) when the remote UE is in the (Uu) RRC connected state, a required system message may be requested from the base station by means of a Uu interface dedicated message, and after the remote UE transmits a request to the base station, if relay re-selection or cell re-selection occurs before a response from the base station is received;
4) upon the remote UE receiving an RRCReject message transmitted by the base station; and
5) when T304 of the remote UE expires, or a timer similar to T304 and used to control the remote UE to perform path conversion.

T300 is a timer that is started after the remote UE transmits an RRCEstablishmentRequest message to the base station, and stops when an RRCEstablishment message returned by the base station is received.

The path conversion may refer to conversion from an indirect path to a direct path, that is, the remote UE being connected to the base station by means of the relay UE is converted to the remote UE being directly connected to the base station.

T304 is a timer that is started when the remote UE receives a handover command or a path conversion command (these commands may be included in an RRCReconfiguration message), and stops after a handover or path conversion is successfully completed.

Step 603 is the same as step 105, and step 605 is the same as step 107.

Optionally, the first indication in the PC5-RRC message and the second indication in the Uu interface RRC message in Embodiment 1 to Embodiment 6 may be indicated using a MAC CE means.

Figure 10:
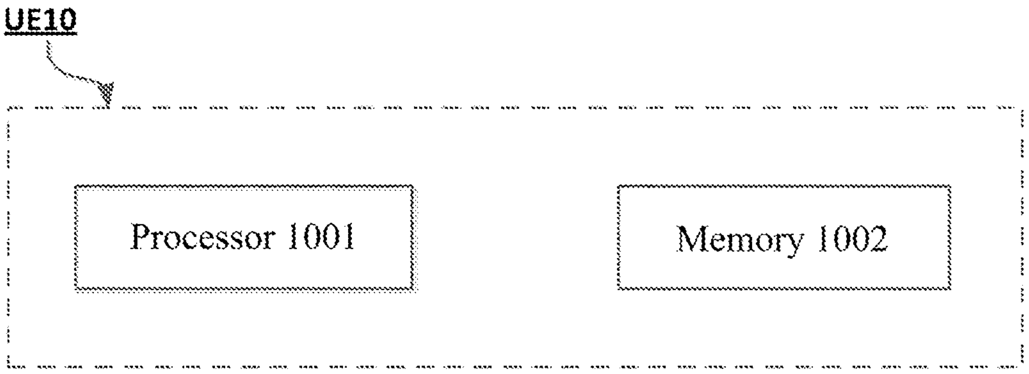
FIG. 10 shows a block diagram of user equipment (UE) according to the present invention.

FIG. 10 is a simplified structural block diagram of user equipment (UE) relating to the present invention. As shown in FIG. 10, user equipment (UE) 1000 includes a processor 1001 and a memory 1002. The processor 1001 may include, for example, a microprocessor, a microcontroller, an embedded processor, and the like. The memory 1002 may include, for example, a volatile memory (such as a random access memory (RAM)), a hard disk drive (HDD), a non-volatile memory (such as a flash memory), or other memories. The memory 1002 stores program instructions. The instructions, when run by the processor 1001, can perform the above method performed by user equipment as described in detail in the present invention.

The program running on the device according to the present invention may be a program that enables a computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing the programs by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application-specific integrated circuits (ASICs), field-programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment (UE), comprising:
- a processor; and
- a memory storing instructions that, when executed by the processor, cause the UE to:
  - receive an RRCReconfiguration message, including a first PC5 Radio Link Control (RLC) release indication, from a base station;
  - set a second PC5 RLC release indication in an RRCReconfigurationSidelink message based on the first PC5 RLC release indication received in the RRCReconfiguration message; and
  - transmit the RRCReconfigurationSidelink message to another UE.

2. The UE according to claim 1, wherein the instructions, when executed by the processor, further cause the UE to:
- in a case that the RRCReconfiguration message further includes a Uu RLC release indication, release a Uu RLC entity.

3. The UE according to claim 1, wherein the instructions, when executed by the processor, further cause the UE to:
- re-establish a PC5 RLC entity for a Signaling Radio Bearer 1 (SRB1) before transmitting an RRCReestablishmentRequest message to a base station in a case that the UE is a layer-2 (L2) UE-to-Network (U2N) remote UE.

4. The UE according to claim 1, wherein the instructions, when executed by the processor, further cause the UE to:
- re-establish a PC5 RLC entity for a Signaling Radio Bearer 1 (SRB1) upon reception of an RRCRelease message with a suspendConfig from a base station in a case that the UE is a layer-2 (L2) UE-to-Network (U2N) remote UE.

5. Another user equipment (UE) communicating with the UE according to claim 1, the other UE, comprising:
- a processor; and
- a memory storing instructions that, when executed by the processor, cause the UE to:
  - receive the RRCReconfigurationSidelink message from the UE; and
  - in a case that the RRCReconfigurationSidelink message includes a PC5 RLC release indication, release a PC5 RLC entity.

6. A method performed by a user equipment (UE), the method comprising:
- receiving an RRCReconfiguration message, including a first PC5 Radio Link Control (RLC) release indication, from a base station;
- setting a second PC5 RLC release indication in an RRCReconfigurationSidelink message based on the first PC5 RLC release indication received in the RRCReconfiguration message; and
- transmitting the RRCReconfigurationSidelink message to another UE.

* * * * *